United States Patent [19]

Thompson, Jr. et al.

[11] 4,446,742
[45] May 8, 1984

[54] MOTION TRANSMISSION LIMITING APPARATUS

[75] Inventors: Jack M. Thompson, Jr., Milford; Theodore H. Leist, Jr., Bethany, both of Ohio

[73] Assignee: Structural Dynamics Research Corporation, Milford, Ohio

[21] Appl. No.: 339,845

[22] Filed: Jan. 18, 1982

[51] Int. Cl.³ .............................................. B06B 1/10
[52] U.S. Cl. ....................................... 73/663; 73/665; 181/121
[58] Field of Search ................. 73/663, 665, 666, 667, 73/668, 669, 672; 181/121

[56] References Cited

U.S. PATENT DOCUMENTS

| | | |
|---|---|---|
| 2,890,584 | 6/1959 | Dickie . |
| 2,955,460 | 10/1960 | Stevens et al. . |
| 3,044,292 | 7/1962 | Matthews . |
| 3,800,588 | 4/1974 | Larson et al. . |
| 3,911,732 | 10/1975 | Larson . |
| 3,913,389 | 10/1975 | Larson . |
| 3,918,298 | 11/1975 | Petersen et al. . |
| 4,011,749 | 3/1977 | Cappel . |
| 4,164,152 | 8/1979 | Lemonde et al. . |
| 4,265,123 | 5/1981 | Cappel ................................. 73/663 |

*Primary Examiner*—Howard A. Birmiel
*Attorney, Agent, or Firm*—Wood, Herron & Evans

[57] ABSTRACT

A seismic testing apparatus is provided in which linear motion or excitation of a horizontally disposed table is achieved simultaneously along three mutually orthogonal axes by means of independently operable hydraulic-actuator assemblies. Rotational or torsional motion of the table about the linear excitation axes is resisted by separate, mechanical rotation-inhibiting means each consisting of a torsionally rigid structure disposed parallel to the table and perpendicularly to their respective associated axes of excitation. The torsionally rigid structures are each connected to the table at two spaced-apart points, with all four points of connection lying in the same plane.

3 Claims, 6 Drawing Figures

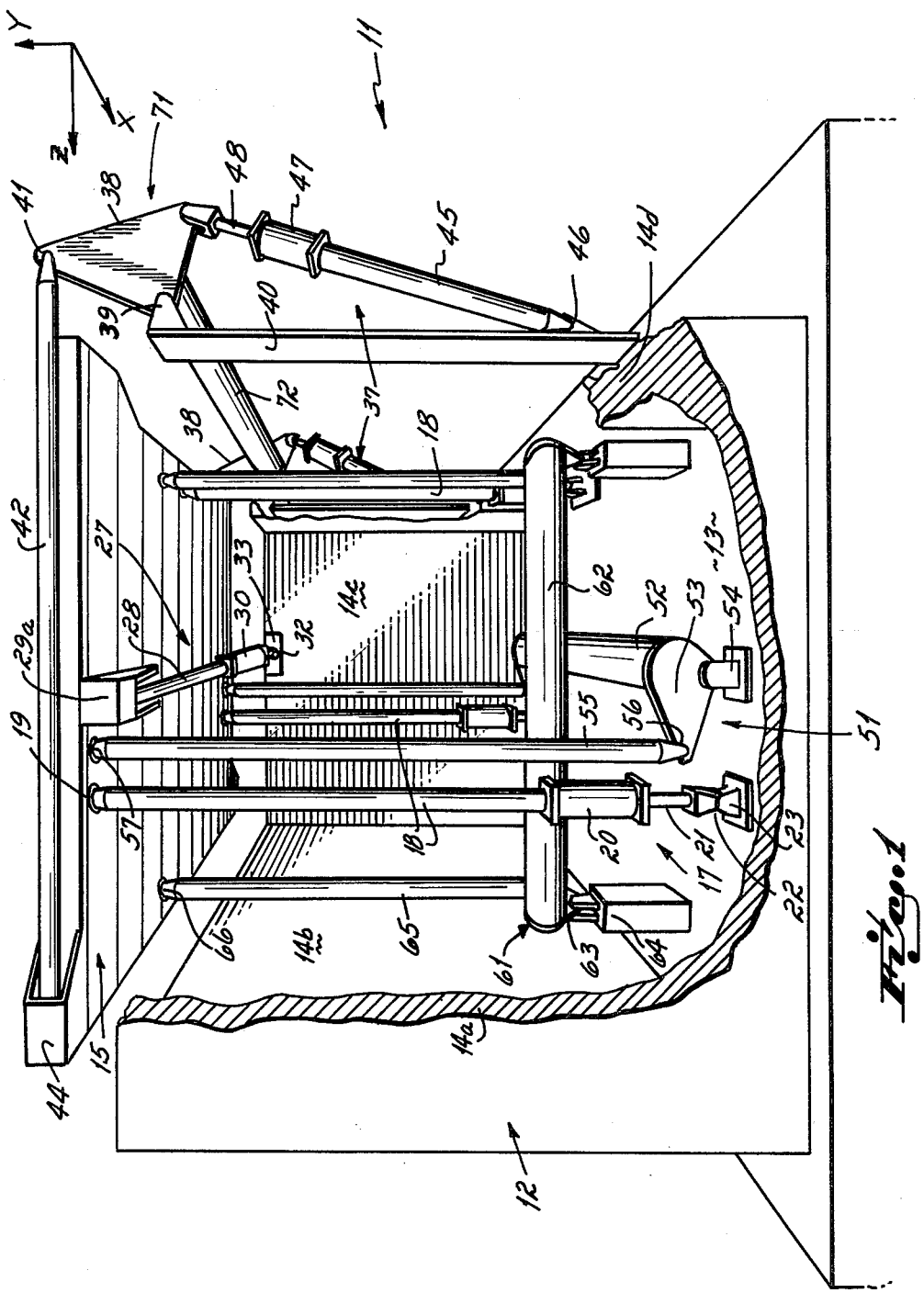

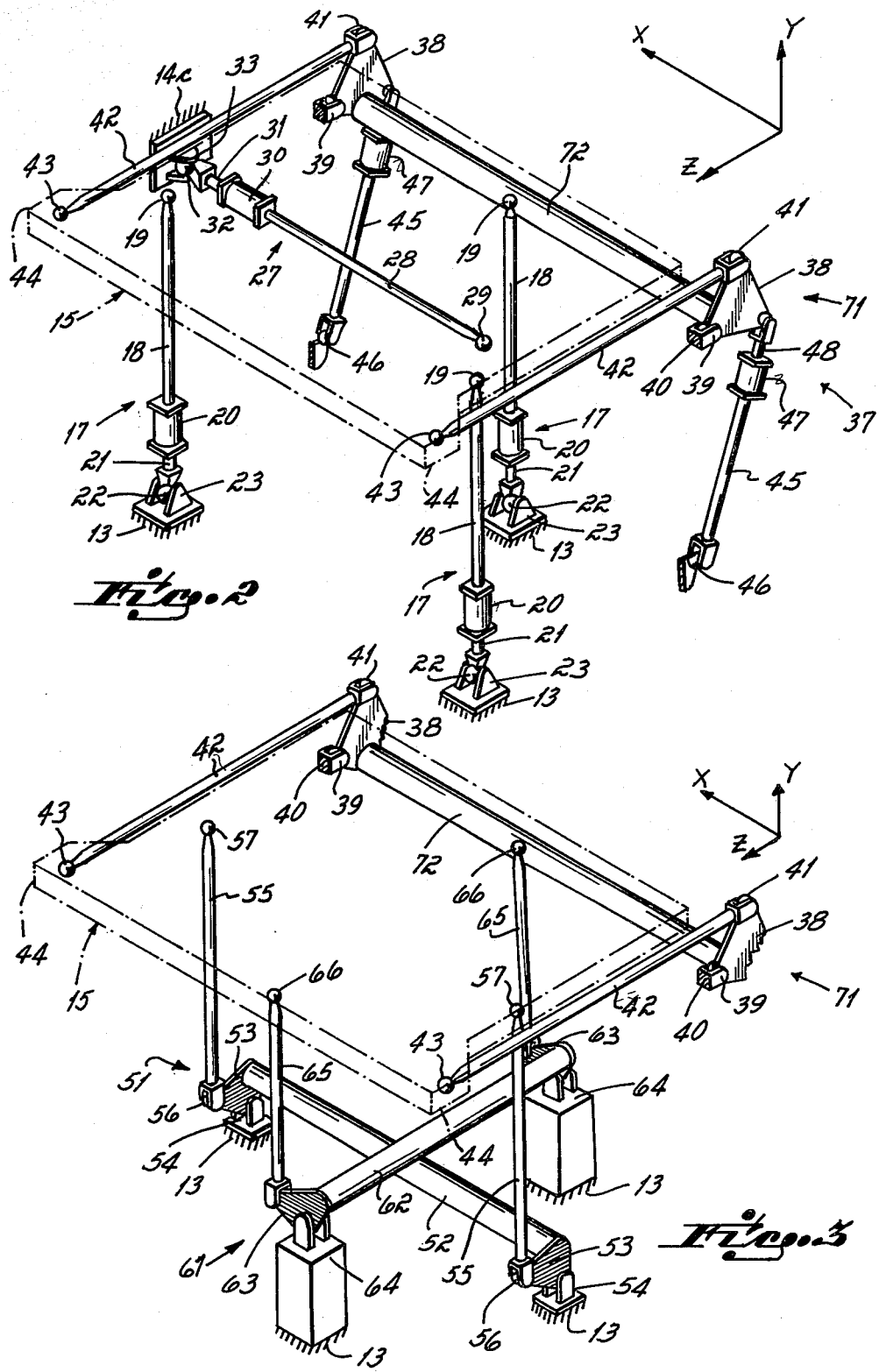

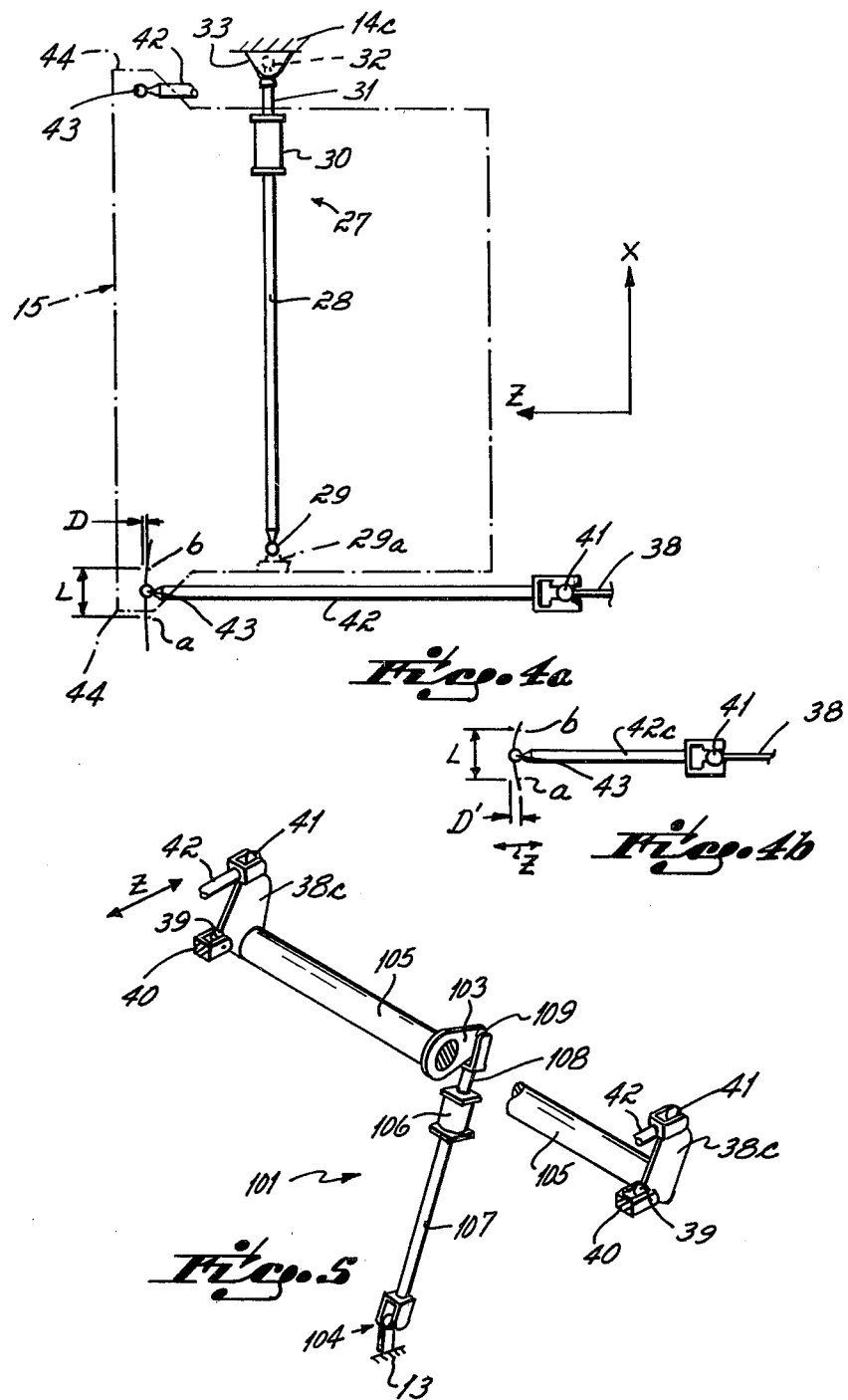

MOTION TRANSMISSION LIMITING APPARATUS

FIELD OF THE INVENTION

This invention relates to the field of seismic testing of objects, and, more particularly, to a seismic test apparatus capable of producing linear motion simultaneously along three mutually orthogonal axes while minimizing rotational movement about such axes.

BACKGROUND OF THE INVENTION

Space hardware, power plant equipment particularly for the nuclear industry, and a number of other devices which must be designed to meet high standards of resistance to shock and vibration are typically analyzed on testing apparatus capable of independently producing controlled motion simultaneously along up to three perpendicular axes. The majority of known devices of this type generally consist of multiple hydraulic actuators attached at one end to a fixed surface or ground and at the other end to various surfaces of a table upon which the device to be tested is mounted. Operation of the hydraulic actuators creates movements of the table along up to three axes for simulating seismic loads or similar disturbances. Strain gauges, accelerometers, or like measuring elements are attached to the device placed on the table and monitor the response of the device to such loads using known techniques.

One of the major problems associated with known seismic testing apparatus is the presence of undesired, rotational, tilting, or torsional movement of the table about the axes of excitation, which introduces inaccuracies in excitation of the device placed on the table for testing. This problem is occasioned by the fact that when a device is placed on top of the table, the combined center of gravity of the table and device is typically above or offset from the lines of action or excitation of the linear hydraulic actuators mounted to the table. Thus, as the table is linearly oscillated along its three orthogonal excitation axes, the combined center of gravity of the table and device, which is offset relative to the excitation axes, creates moments about these axes, tending to rotate the table.

The solutions suggested in the prior art to avoid this inherent tendency of the vibrating table to tilt or rotate generally rely on electronic closed loop position control systems which operate on the basic premise of correcting or compensating for the rotational movement once it has occurred rather than preventing such movement initially. While specific features of known control schemes vary from system to system, such systems typically rely on the development of a positional error signal in response to unwanted rotational or torsional movement which is sensed by appropriate position sensor means. The positional error signal is fed to the actuators as an input for continuous correction of the nonlinear, or rotational, motion about one or more axes. Illustrative of such prior art schemes are U.S. Pat. Nos. 3,800,588; 3,911,732; 3,913,389 to Larson; and 3,918,298 to Petersen, et al.

A problem with system of the foregoing type, in addition to the need for compensating electronic controls, is that they inherently require larger and/or more pumps, valves, cylinders, etc., which generally increases the expense and difficulty of accomplishing the end result. This problem is due to the fact that the actuators must perform the dual function of imparting the desired linear oscillatory movement to the vibrating table as well as correct undesired rotational or torsional movement.

SUMMARY OF THE INVENTION

This invention provides a seismic testing apparatus in which linear motion or excitation is achieved simultaneously along three mutually orthogonal axes without introducing undesirable rotational motion. This is accomplished by utilizing mechanical means to resist rotational or torsional motion about each linear excitation axis, thus completely eliminating the complicated electronic tilt correction controls found in the prior art.

The seismic testing apparatus of this invention, in a preferred form, includes a rigid table to which x axis, y axis and z axis linear hydraulic actuation assemblies are attached for independent linear movement of the table simultaneously along each such axis. The linear hydraulic actuator assemblies each consist of at least one elongated stinger, link or connecting rod (hereinafter referred to as "stinger") connected to a hydraulic cylinder having a piston capable of linerally reciprocating the stinger, and in turn the table to which the stinger is connected, along respective ones of the x, y and z axes. The y axis hydraulic actuator assembly, which vibrates the table in a vertical direction, includes three separate stinger-hydraulic piston and cylinder units spaced at approximately 120° intervals about the center of gravity of the table, which perform the dual function of linear excitation along the y axis and vertical support of the table. The individual, mechanical means which resist undesired rotation of the table about the excitation axes caused by extraneous moments applied to the table principally include a torsionally stiff member, preferably in the form of an elongated hollow tube, which is connected at two spaced apart locations to the table, and at two spaced apart locations to a fixed base or ground, with all four points of connection ideally located in a common plane. Rotation of the table attempts to move the ends of the torsionally stiff member relative to each other. This deflection gives rise to rotation-countering forces within the torsionally stiff member. The extent of table rotation for a given moment then becomes a function of the torsional stiffness of the torsional member, and the length of the arms at the end of the torsional member which connect it to the table.

The rotation-inhibiting means are passive in nature, that is, they move freely in response to linear movement of the table and do not incorporate actuators of any kind. Yet, when extraneous moments are applied to the table about any one or more of the excitation axes, the respective rotation-inhibiting means effectively resist such moments elastically to assure linear motion of the table is maintained without the introduction of undesired rotation. Stabilizing or roll-inhibiting forces are generated by the elastic deformation of the rotation-inhibiting means rather than by the actuators. As a consequence, in a strict physical sense, no net work is performed by the roll bars. If such rotation-inhibiting forces were supplied electrohydraulically via rotation-inhibiting actuators, net positive work would be expended by the flow through the servovalves of the rotation-inhibiting actuators.

DESCRIPTION OF THE DRAWINGS

The structure, operation and advantages of this invention will become apparent upon consideration of the following description taken in conjunction with the accompanying drawings wherein:

FIG. 1 is a cutaway isometric front view of the preferred embodiment of the seismic testing apparatus of the invention;

FIG. 2 is a partial schematic isometric view showing the x axis, y axis and z axis hydraulic actuator assemblies incorporated in the invention.

FIG. 3 is a partial schematic isometric view showing the x axis, y axis and z axis rotation-inhibiting means incorporated in the invention.

FIG. 4a is a partial schematic view of the x axis hydraulic actuator assembly and a single elongated z axis stinger.

FIG. 4b is a schematic view of a shortened z axis stinger and the translation D it would undergo in operation.

FIG. 5 is a schematic view of an alternate embodiment of the z axis hydraulic actuator assembly.

DETAILED DESCRIPTION OF THE INVENTION

Referring now to the drawings and particularly to FIG. 1, the seismic testing apparatus of the invention is generally indicated by the reference numeral 11. For purposes of the following discussion, the z axis of apparatus 11 will be considered to extend horizontally across the page of FIG. 1, the y axis vertically along the page and the x axis into the page. As mentioned above, the purpose of apparatus 11 is to test the response of various devices to the kind of movements or oscillations which could occur during an earthquake or similar disturbance. To simulate such movement, apparatus 11 includes linear excitation means capable of selectively, independently and bidirectionally moving the device along the x, y and z axes simultaneously. Since the accuracy of the imposed linear motion or excitation imparted to a device being tested is critically important, rotational motion about the linear excitation axes must be minimized. Accordingly, the apparatus 11 includes means to assure that the linear excitation along the x, y and z axes is unaccompanied by rotational motion about these axes. Apparatus 11 therefore includes individual, mechanical rotation-inhibiting means to assure the reliability and accuracy of the linear motion on the device along each of the axes of linear excitation.

For reasons of safety, the apparatus 11 is enclosed within a housing 12, preferably of concrete, having a horizontal planar floor, base section or ground 13 and vertical outer walls 14a, 14b, 14c, and 14d which extend upwardly from the base 13. The apparatus 11, considered in detail, includes a rigid table 15, having dimensions slightly smaller than that of the base 13, which is disposed within housing 12 at a spaced distance above the base 13. Table 15 may be formed of reinforced concrete, steel, or a suitable equivalent material capable of supporting, in the embodiment shown herein, a maximum load of approximately 10,000 lbs. with a negligible static bending. Additionally, the table should be free of natural frequencies in the excitation frequency range.

Referring now to FIGS. 1 and 2, the means for linearly actuating table 15 along each of the x, y and z axes is seen to include a group of three y-axis linear hydraulic actuator assemblies, each labelled generally with the reference 17, which are vertically disposed at approximately 120° intervals about the center of gravity of table 15. The y-axis actuator assemblies 17 perform the dual functions of supporting the table 15 and reciprocating it linearly along the y axis while the embodiment shown, which has actually been constructed and successfully operated, uses three y-axis actuator assemblies. It is believed that the use of four y-axis actuators, arranged in pairs, could be utilized to support and reciprocate table 15 in a manner which stress the table least.

Respective y-axis actuator assemblies 17 include an elongated stinger, link, or connecting rod 18 pivotally attached at one end to the bottom of table 15 through spherical bearings 19. The other end of each stinger 18 is attached to a hydraulic cylinder 20 having a piston therein from which extends downwardly therefrom a piston rod 21. The lower end of each piston rod 21 pivotally connects to a respective spherical bearing 22 mounted to a bracket 23, which bracket 23 is fixed to the base 13 of housing 12. The hydraulic cylinders 20 and associated piston rods 21 function to reciprocate the stingers 18 and table 15 linearly upwardly and downwardly along the y axis.

The means for reciprocating table 15 horizontally in the x direction is similar to that discussed above for y axis excitation. Referring to FIGS. 1 and 2, a single x axis actuator assembly 27 is shown in position immediately below the bottom surface of table 15. Actuator assembly 27 includes an elongated stinger 28 pivotally mounted at one end by a spherical bearing 29 to a plate 29a which is fixed to and extends downwardly from the base of table 15. The other end of stinger 28 is attached to a hydraulic cylinder 30 having a piston therein from which extends a piston rod 31. The piston rod 31 of x-axis actuator assembly 27 is pivotally connected to a spherical bearing 32, which in turn is mounted on a stationary bracket 33. The bracket 33 is bolted or otherwise secured to the wall 14c of housing 12, providing a fixed point against which the hydraulic cylinder 30 and piston rod 31 may act to linearly move stinger 28, and in turn table 15, along the x axis.

The z axis hydraulic actuator assemblies 37 are similar to those actuators 27 and 17 for the x and y axes with a slight change to accommodate space requirements of apparatus 11. As shown in FIGS. 1 and 2, a pair of triangular-shaped bell cranks 38 are pinned for rotational movement only at an apex 39 to the upper ends of stationary vertical supports 40. The bell cranks 38 are each pivotally connected at a second apex 41 by spherical bearings to one end of a respective alongated stingers 42 which extend parallel to the z axis along either side of table 15. The other ends of stringers 42 are pivotally connected via a spherical bearing 43 to brackets 44 extending horizontally outwardly from opposing edges of table 15. Each of the z axis hydraulic actuator assemblies 37 further includes a second pair of stingers 45 pivotally connected by spherical bearings 46 to the base of respective support members 40. Stingers 45 and extend upwardly therefrom at an acute angle and are connected to hydraulic cylinders 47 which include pistons from which extend piston rods 48. The outwardly extending ends of piston rod 48 are pivotally connected at a third apex 49 of bell cranks 38 by spherical bearings. As is apparent from FIGS. 1 and 2, actuation of hydraulic cylinders 47 and piston rods 48 causes each of the bell cranks 38 to pivot about the stationary support members 45 on their pinned connections 39 which, in turn, drives the first pair of stingers 42 to reciprocate table 15 linearly along the z axis.

As mentioned above, a primary concern in the design of a seismic testing apparatus is the avoidance of rotational movement of the table about any of the axes of excitation, which has been found to adversely affect the accuracy of the excitation or motion imposed on the devices placed on the table 15 for testing. These rotational motions may be developed where the combined center of gravity of the table 15 and the device placed thereon is above or laterally offset from the axes of excitation of any of the hydraulic actuator assemblies 17, 27 and 37. For example, assume that a device is placed in the center of table 15 and has a center of gravity a given distance above the upper surface of table 15. The combined center of gravity of table 15 and the device would thus be at some point between the upper surface of table 15 and the center of gravity of the device. Since both the x axis actuator assembly 27 and z axis actuator assemblies 37 exert a linear force on table 15 which acts in essentially the same horizontal plane in which table 15 is disposed, rotation-inducing moments about the x and z axes may be applied to table 15 during the operation of testing apparatus 11 due to the offset between the x-y excitation plane of the table and the combined center of gravity of the table and device under test. This is particularly true for relatively massive devices having a relatively large vertical dimension or height.

In contrast to the relatively complex electrical control systems shown in the prior art which attempt to overcome torsional or rotational movement of the support table, this invention provides a rotation-inhibiting means for each of the axes of excitation which are entirely mechanical and passive in operation. In the broadest sense, each of the rotation-inhibiting means used herein may be thought of as a torsionally rigid structure, preferably in the form of an elongated tube, disposed parallel to the table and perpendicularly to their respective associated axes of excitation. The torsionally rigid structures are connected to table 15 at two spaced apart points, and the base 13 of housing 12 at corresponding spaced apart points. The points of connection to table 15 and the two points of connection to base 13 all lie within the same plane. To effectively resist rotation-inducing moments from being applied to the table 15 about a given axis of excitation, the rotation-inhibiting means must be torsionally rigid and not permit significant torsional deflection under anticipated loads.

Referring to FIG. 3, the z axis rotation-inhibiting means is labeled generally with the reference 51. Rotation-inhibiting means 51 includes an elongated generally cylindrical torsion tube 52 disposed parallel to the table 15 and perpendicularly to the z axis, to which a lever 53 is rigidly mounted at each end. The levers 53 are pivotally mounted to respective stationary mounts 54 which are fixed to the base 13 of housing 12. A pair of vertical connecting rods or stingers 55 are pivotally mounted by spherical bearings 56 to the free end of levers 53, and extend upwardly into engagement with the base of the table 15 via spherical bearings 57. When apparatus 11 is in a non-operating mode, and assuming no torsional deflection in tube 52, the connections of levers 53 to the rods 55 and mounts 54 lie in the same plane, which in turn maintains the upper ends of rods 55 in a horizontal plane, preventing table rotation about the z axis.

The operation of z axis rotation-inhibiting means 51 is passive in nature in the sense that it does not actively participate in the linear excitation of table 15 during the operating mode of apparatus 11. For example, in response to linear excitation along the y axis, connecting rods 55 are moved vertically upwardly and downwardly causing levers 53 to pivot on the mounts 54. Excitation movement of table 15 along the x and z axes is accommodated by the spherical bearing end connection 56, 57 of rods 55 which pivot sufficiently to avoid the imposition of bending moments on the rods.

Since the three y axis hydraulic actuator assemblies 17 are independently driven and could conceivably be moving nonsynchronously, and further since the combined center of gravity of table 15 and device-to-be-tested may not be coincident with the center of table 15, a moment can be applied to table 15 tending to rotate the table about the z axis. If such a rotation-inducing moment is developed, rotation-associated forces from the table 15 are transmitted through connecting rods 55 and levers 53 directly to the torsion tube 52 of the z axis rotation-inhibiting means 51. The tube 52 is sufficiently torsionally rigid to resist such moments and prevent table 15 from tilting or rotating appreciably about the z axis. Linear motion along the z axis is thus assured.

The same principle of operation and structure of the z axis rotation-inhibiting means 51 is utilized in the x axis rotation-inhibiting means labeled generally with the reference 61 in FIGS. 1 and 3. The x axis rotation-inhibiting means 61 means includes a torsion tube 62 disposed parallel to the table 15 and perpendicularly to the x axis with a lever 63 rigidly connected at each end, the levers in turn are pivotally fixed to mounts 64 fixed to base 13. A pair of connecting rods 65 are pivotally connected by spherical bearings 66 to table 15 at their upper end and to respective ones of the levers 63 at their lower end. As is apparent from FIG. 3, loads caused by rotation of table 15 about the x axis are transmitted through connecting rods 65 and levers 63 to the torsion tube 62 of x axis rotation-inhibiting means 61 which resists the same to effectively prevent non-linear motion of table 15 about the x axis.

Finally, the y axis rotation-inhibiting means is labelled generally with the reference numeral 71 in FIGS. 1 and 3. The y axis rotation-inhibiting means 71 acts similarly to those for the x and z axes, except that existing structure is used to advantage. Instead of utilizing separate connecting rods as in the x and z rotation-inhibiting means 61 and 51 respectively, the y axis rotation-inhibiting means 71 includes a torsion tube 72 disposed between and rigidly attaching to the bell cranks 38 and stingers 42 connecting table 15 and bell cranks 38 as described above. Torsion tube 72 is free to move with the pivoting action of bell cranks 38, but in the event a moment is applied to table 15 tending to rotate it about the y axis it will be transmitted through stingers 42 to the bell cranks 38 and to the torsion tube 72 which resists it. Thus, rotational motion of table 15 about the y axis is minimized by the torsional stiffness of the tube 72.

The various stingers are constructed to be stiff in an axial direction, and have high buckling resistance to axial compression and high lateral bending natural frequencies or well damped lateral bending modes.

Importantly, the x, y and z axis rotation-inhibiting means 61, 71 and 51 are completely mechanical in nature and operate immediately when a rotation-inducing moment applied to table 15 attempts to induce tilting or rotation along their respective axes. This is in contrast to the electric control circuitry found in the prior art wherein a correction or compensation signal is developed after the torsional motion has already occured, which signal operates the actuators to correct or null out the unwanted rotational motion. By operating to inhibit rotational or tilting motion before it occurs using passive mechanical means, this invention achieves a substantial improvement in performance over known seismic testing apparatus.

A further improvement over the prior art, attributable to the use of elongated stingers of substantial length, is that such stingers minimize geometric cross-linking or cross-talk between the linear actuators of the system as table 15 oscillates in different directions. This concept of geometric cross-linking may be best understood with reference to FIG. 4a, in which one of the stingers 42, 28 of the z axis actuator assembly 37 and the x axis hydraulic actuator assembly 27 are shown. As discussed above, stinger 42 is pivotally attached at 41 to bell crank 38 by a spherical ball bearing and at the other end to the bracket 44 by means of another spherical bearing 43. Assume for purposes of this discussion that table 15 is being reciprocated only by the x axis hydraulic actuator assembly 27 which has a stroke length of L. As shown in dotted lines, the end of stinger 22 connected to bracket 44 will move in an arc between points a and b about the spherical connection to bell crank 38 as the x axis actuator 27 moves through its stroke L. This is true because the end of stinger 42 connected to bell crank 38 is fixed laterally with respect to the x axis while the other end of stinger 42 is moveable with table 15 in response to operation of the x axis hydraulic actuator assembly 27. As is apparent from FIG. 4a, since stinger 42 moves in an arc as table 15 is reciprocated a distance L along the x axis, the table will also move horizontally a distance D in the z direction. The z axis table movement D, caused solely by the x-axis actuator 27, is undesirable since under the assumed condition the z axis actuator 37 is not actuated. This phenomenon of z axis table movement due to x-axis actuator operation is termed "geometrical cross-linking or cross-talk".

The unwanted movement induced by geometrical cross-talk varies significantly with the length of stinger 42. As shown in FIG. 4b, a shorter stinger 42c will produce a much larger unwanted movement D' of table 15 horizontally along the z axis for the same movement L of table 15 along the x axis since the arc through which the shorter stinger 42c pivots has a much smaller radius. Therefore, by making stinger 42 elongated, the unwanted deflection D is greatly reduced which in turn diminishes unwanted horizontal movement of table 15 along the z-axis. This same analysis applies to the stingers 28, 18 utilized in the x axis and y axis hydraulic actuator assemblies 27 and 17, so that the cross-linking effect which each actuator assembly has on the other is effectively reduced herein.

Another feature of the subject invention which should be noted is the protection afforded the z axis hydraulic actuator assemblies 37 against damage due to the inertial forces developed when table 15 moves in the x and y directions. It can be appreciated that excitation of table 15 in the x and y direction will create inertial forces in the stingers 42 along both the y and x axes. These lateral inertial forces could damage or cause undue wear of the z axis actuator assemblies 37 if these inertial forces developed in stingers 42 were transmitted to ground via side loads in the hydraulic cylinder 47, piston rod 48 and stingers 45. By reason of the connection of the bell cranks 38 to the vertical supports 40, to the inertial forces on stingers 42 in the x and y direction are transmitted directly through bell cranks 38 and vertical supports 40 to the base 13, rather than through the z actuator assemblies 37 thereby preventing undue wear or damage thereto.

It should be understood that while preferred means of linear actuation of table 15 and preferred rotation-inhibiting means have been discussed herein, this invention is not limited thereto. The only requirement on the actuators is that the direction of application of the force in any given direction not be in the plane of the four connections to the torsionally rigid member associated with that axis. For example, referring to FIG. 5, an alternate z axis hydraulic actuator assembly is shown and labeled generally with the reference numeral 101. In this embodiment, a single lever 103 is fixed at one point to torsion bar 105 which is pivotally attached at each end by a bell-crank 38c to the table 15 and frame support 40 as previously discussed. As elongated stinger 107 is pivotally attached at one end to base 13 by a spherical bearing 104, and at the other end connects to a hydraulic cylinder 106 having a piston rod 108 extending outwardly therefrom as discussed above. The piston rod 108 is pivotally connected at 109 to lever 103 by a spherical bearing, and is operable to reciprocate torsion bar 105, and in turn table 15, linearly along the z axis. Although this embodiment requires the torsion bar 105 to perform the dual function of transmitting reciprocating force to the table 15 along the z axis and resisting torsion about the y axis, it may be a viable alternative in some applications. Other actuator arrangements are also possible.

While the subject invention has been described with reference to a preferred embodiment, persons skilled in the art to which this invention pertains will readily appreciate modifications and changes which may be made without departing from the spirit of the invention. Therefore, I do not intend to be limited except by the scope of the appended claims.

Thus having described the invention, what is claimed is:

1. A seismic testing apparatus comprising:
   a fixed base;
   a rigid table horizontally disposed a spaced distance above said base;
   excitation means for moving said table linearly along a predetermined X-axis, said excitation means including a pivot member connected to said table and to an actuator, said actuator being adapted to pivot said pivot member and in turn move said table along said predetermined X-axis;
   excitation means adapted to simultaneously move said table linearly along an axis transverse to the X-axis;
   means connected between said base and said pivot member for preventing motion of said pivot member in said transverse direction and thereby preventing said linear motion of said table transverse to said X-axis from being transmitted via said pivot member to said actuator of said X-axis excitation means.

2. The seismic testing apparatus as in claim 1 in which said pivot member comprises a pair of support members mounted at one end to said base, a pair of laterally spaced bell cranks each having an apex pivotally mounted to the other end of one of said support members, and a pair of elongated rods each connected at one end to said table and at the other end to another apex of one of said bell cranks, each said actuators being connected at one end to said base and at the other end to the other apex of one of said bell cranks, each said actuators being adapted to pivot one of said bell cranks for linearly moving said elongated rods, and in turn said table, along the predetermined X-axis.

3. The seismic testing apparatus as in claim 2 in which said means for preventing transmission of linear motion of said table to said actuator of said X-axis excitation means along an axis perpendicular to said X-axis comprises said support members connected to said bell cranks, said motion of said table along axes perpendicular to said X-axis being transmitted through said elongated rods and said bell cranks directly to said support members thereby bypassing said actuators.

* * * * *